United States Patent
Clark et al.

(10) Patent No.: US 9,091,448 B2
(45) Date of Patent: Jul. 28, 2015

(54) MULTIPLE TEMPERATURE HOT WATER DISPENSING SYSTEM

(75) Inventors: Charles H. Clark, Chatham, IL (US); Suresh Radhakrishnan, Chatham, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 953 days.

(21) Appl. No.: 13/140,520

(22) PCT Filed: Dec. 18, 2009

(86) PCT No.: PCT/US2009/068796
§ 371 (c)(1),
(2), (4) Date: Jul. 19, 2011

(87) PCT Pub. No.: WO2010/080628
PCT Pub. Date: Jul. 15, 2010

(65) Prior Publication Data
US 2011/0259472 A1    Oct. 27, 2011

Related U.S. Application Data

(60) Provisional application No. 61/138,614, filed on Dec. 18, 2008.

(51) Int. Cl.
*B65B 3/04*    (2006.01)
*F24D 19/10*    (2006.01)

(52) U.S. Cl.
CPC .................................. *F24D 19/1051* (2013.01)

(58) Field of Classification Search
USPC .............. 141/82, 100, 104, 105, 107; 99/281, 99/323.3, 300; 392/449, 451; 222/54, 222/146.2, 146.5
See application file for complete search history.

(56) References Cited

U.S. PATENT DOCUMENTS

| | | | |
|---|---|---|---|
| 4,480,173 A * | 10/1984 | Butterfield | .................... 392/401 |
| 4,791,860 A | 12/1988 | Verheijen | |
| 5,111,969 A | 5/1992 | Knepler | |
| 5,858,437 A | 1/1999 | Anson | |
| 6,164,189 A | 12/2000 | Anson | |
| 8,225,961 B2 * | 7/2012 | Anson | .............. 222/54 |
| 2006/0042470 A1 | 3/2006 | Anson | |
| 2007/0215239 A1 | 9/2007 | Dorney | |
| 2007/0272085 A1 | 11/2007 | Ghassemlou et al. | |
| 2008/0092746 A1 | 4/2008 | Clark et al. | |

OTHER PUBLICATIONS

Int'l Search Report & Written Opinion issued in PCT/US09/68796 (2010).

* cited by examiner

*Primary Examiner* — Jason K Niesz
(74) *Attorney, Agent, or Firm* — Barnes & Thornburg LLP

(57) ABSTRACT

A system and method for controllably dispensing a predetermined volume of water at a predetermined temperature. The system and method include at least one heated water source and at least one second water source. Water is controllably dispensed from the heated water source and controllably combined with the controllably dispensed water from the second water source to produce a resultant predetermined volume of water at a resultant predetermined temperature. The system and method also includes controls and/or interfaces which allow a user to control the volume and temperature of water dispensed. The user may directly control the volume and/or temperature or may indirectly control the volume and temperature such as by introducing a control media, control selection, or recipe by which the user selects the choice but does not specify the details of the parameters associated with the choice.

15 Claims, 2 Drawing Sheets

MULTIPLE TEMPERATURE HOT WATER DISPENSING SYSTEM

CROSS REFERENCE TO RELATED APPLICATIONS

This application is a U.S. nationalization under 35 U.S.C. §371 of International Application No. PCT/US2009/068796, filed Dec. 18, 2009, which claims the benefit of priority under 35 U.S.C. §119(e) to U.S. Provisional Patent Application No. 61/138,614, filed Dec. 18, 2008. The disclosures set forth in the referenced applications are incorporated herein by reference in their entireties, including all information as originally submitted to the United States Patent and Trademark Office.

BACKGROUND

It may be useful to provide a system to controllably dispense water at a predetermined temperature in the food production industry. For example, it may be desirable to use a particular water temperature to produce mashed potatoes in a restaurant environment. However, it may also be desirable to use a different water temperature to produce dough in the same restaurant.

It also could be desirable to provide a system which can controllably dispense desired or predetermined volumes of water at a desired temperature. For example, the mashed potatoes may require one gallon of water at a temperature of 200° F. whereas the pizza dough may only require three cups of water at a temperature of 100° F. Further, it might also be desirable to produce these different volumes at difference temperatures in sequence generally without having to wait for any alteration in the water temperature.

These volumes and temperatures may be achieved by heating water, manually on a stove and monitoring the temperature of the water as it is heated. Alternatively, water can be drawn from a hot water dispensing system at a predetermined temperature, and additional water, manually added, to bring the temperature to a desired range. As one might imagine, this can be a challenging task subject to error. Such errors may be magnified in the resulting waste of food product. For example, if the dough is not mixed with the proper temperature water, the yeast in the dough could be underdeveloped as a result of the water being too cool or overdeveloped and killed as a result of the water being too hot.

It has been known that a water heating system can use a heated water tank and a chilled water tank or a reduced hot water tank to produce a desired end result temperature. However, these systems can be complicated and require a considerable amount of space in order to provide the desired result.

With the foregoing in mind, it could be useful to provide a heated water system which can provide a predetermined volume of water at a predetermined temperature for use in the food preparation environment. Also, it could be useful to provide such a system having a user interface to reduce potential errors in setting temperature and volume. Furthermore, it could be useful to provide such a system having a relatively high degree of accuracy in dispensing the selected volume and temperature of water.

DETAILED DESCRIPTIONS

Figure 1:
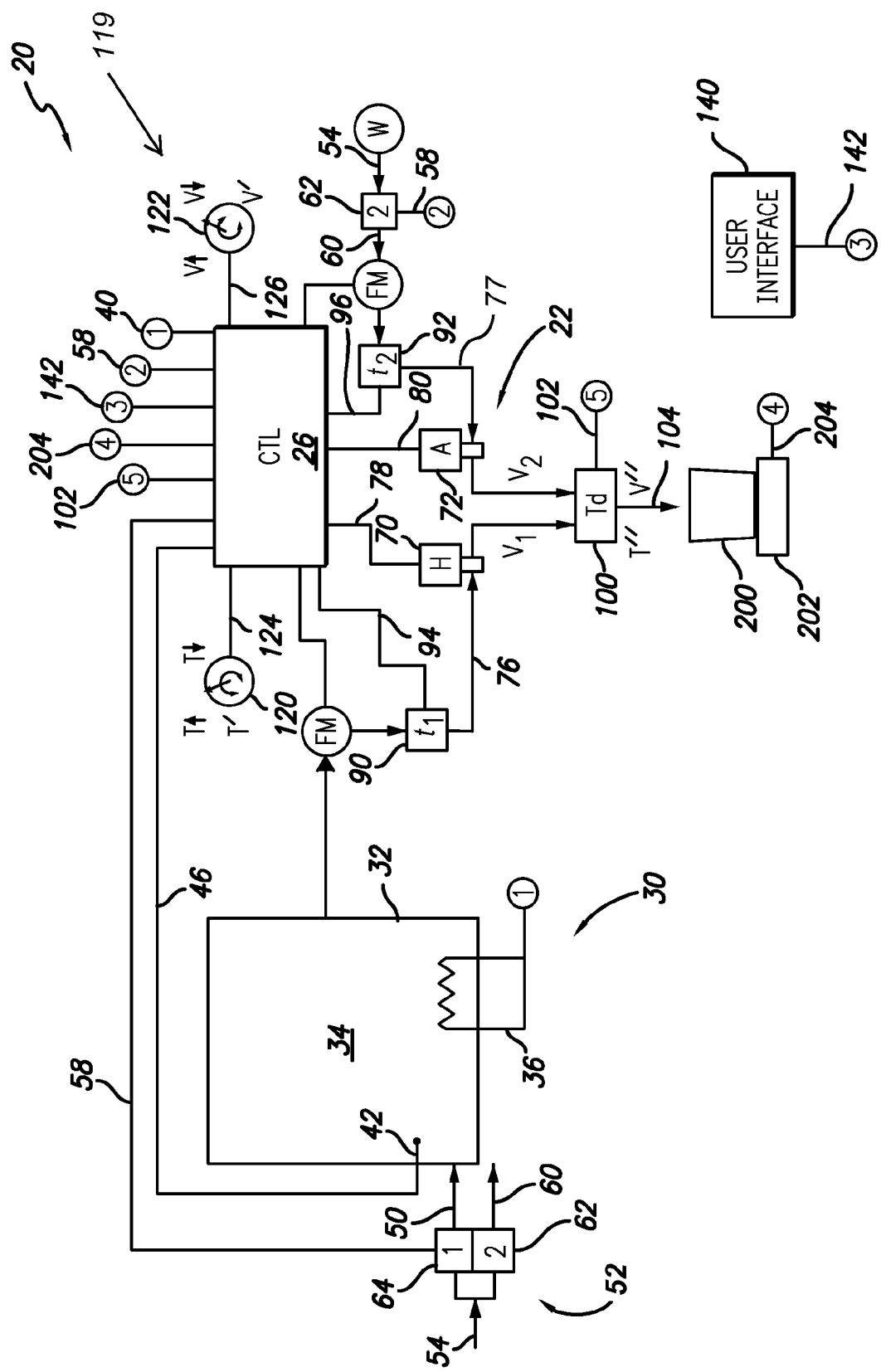
FIG. 1 of diagrammatical illustration of an embodiment of a system for dispensing a desired volume and temperature of heated water.

With reference to the figures, FIG. 1 shows a general diagrammatic illustration of the system 20 which employs a controlled portion 22 for controlling and dispensing a selected or predetermined volume "V" at a predetermined temperature "T". The system 20 includes a controller 26 which is coupled to a variety of controlled, sensors, meters, interfaces and other devices to help select, monitor and control the operation of the system 20.

The system includes a heated water reservoir 30 which includes a container or tank 32 for retaining a volume of water 34. A heater 36 is associated with the tank 32 to heat water 34 retained therein. The heater 36 is coupled via line 40 to the controller 26. A temperature probe 42 is associated with the tank 32 and coupled to the controller 26 over line 46.

Water is introduced into the tank 32 through inlet line 50. A controllable valve 52 communicates with the line 50 to control the inlet flow of water through the pressurized, live or plumbed ambient water source 54. The valve 52 is controlled over line 58 and coupled to the controller 26.

It should be noted at this point that the valve 52 may be a dual valve providing water through line 50 to the tank 32, as well as, water to an ambient temperature line 60 communicating with the system through controllable valve 62. Alternatively, this dual valve 52 can be represented as two individual valves each individually connected to separate live, pressurized, plumbed lines. However, for the present disclosure we will refer to the dual valve 52 which includes valve components 62 and 64. It should be noted that the controllable valve 62 connected to the ambient line 54 is repeated on the right side of FIG. 1 in the interest of clarity with regard to this system. In order words, the left side line 54 and the right side line 54 are the same line with the right side being repeated in the interest of providing a detailed disclosure and clarity in the relationship of the additional components connected to ambient line 54.

As shown in FIGS. 1, 2, 3 and 4 various versions or embodiments of a volume control system 22 can be devised. With reference first to the system as shown in FIG. 1, the volume control includes a heated water "H" control valve 70 and an unheated or ambient water "A" control valve 72. The heated water control valve 70 communicates with heated water line 76 to the heated water reservoir 30. The heated water valve 70 is coupled to the controller 26 via line 78. Similarly, the ambient water control valve 72 is coupled to the water line 77 connected to the ambient water line 60. The ambient water valve 72 is coupled to the controller 26 via control line 80.

These control valves 70, 72 coupled to the controller 26 over lines 78, 80 can be controllably operated to dispense a selected volume of water $v_1$, $v_2$. The precision of these valves 70, 72 can be selected to provide a selected degree of accuracy in dispensing water.

The controller 26 controls the valves 70, 72 to dispense desired volumes $v_1$, $v_2$ of water. A heated water temperature sensor 90 and an ambient temperature sensor 92 detect the corresponding temperatures $t_1$ and $t_2$ and are coupled to the controller 26 over lines 94, 96, respectively. By detecting the temperatures of the water flowing through the corresponding heated water line 76, and ambient water line 77 the controller uses software to controllably operate the corresponding valves 70, 72 to dispense desired volumes of $v_1$, $v_2$ of water. A mathematical equation is be employed to produce a desired volume of water at a desired temperature by controllably mixing corresponding volumes $v_1$, $v_2$ of water at the detected temperatures $t_1$, $t_2$.

By way of example, if a desired volume of water V' needs to be dispensed at temperature T' the equation can use the combination of heated water volume $v_1$ at temperature $t_1$ in combination with ambient water volume $v_2$ at temperature $t_2$ to arrive at a volume of water V" at temperature T". The desired volume and temperature of water (V'T') is approximately equal to the resulting volume and temperature of water (V"T") within some degree of accuracy depending upon the precision of the components used in the overall system 20.

The system can be used as described or an additional temperature detecting component or output temperature sensor 100 can be added to the system. This temperature sensor 100 can be placed downstream from the dispensed volumes of heated water $v_1$ and ambient water $v_2$ after the heated and ambient valves 70, 72 and coupled to a controller 26 over line 102. This temperature sensor 100 helps improve the accuracy of the dispensed volume of water 104 and temperature to be more accurately aligned with the desired volume and temperature of water. Water lines feeding into the temperature detector result in a mixing of water such that the heated water stream 76 and ambient water stream 77 result in a combined water stream 104 down stream from the output temperature sensor 100. As a result the system can detect the heated water temperature 90, the ambient water temperature 92 and use these components in an equation to achieve the selected target temperature. If the target temperature is not detected at the output temperature sensor 100, coupled to the controller 26 over line 102, the controller can use the information from the output temperature sensor to adjust the volumes of the heated water and ambient water to more closely achieve the selected temperature. In other words, the equation between the volume and temperature of the input components, namely, heated water at a selected volume and ambient water at a selected volume, is a general linear relationship. This linear relationship can be calculated by the controller 26 to achieve the selected water temperature. If the selected water temperature is not detected at the output water sensor, the equation can be slightly adjusted to compensate for any variance. The variances may result from any one of a number of circumstances, by way of illustration and not limitation, temperature loss through the dispensing lines, variations in the temperature of the ambient water and the heated water, as well as, variations in the sensor. As such, these multiple sensing devices 90, 92, 100 help to improve the accuracy of the selected output temperature of the water dispensed by the system.

In FIG. 1, the valves, 70, 72 are in the form of a controllable solenoid valve which is pulsed opened and closed to dispensed controlled volumes of water. These dispensed volumes of water or pulses of water can be dispensed into a common dispensing nozzle thereby enhancing the mixing characteristics of the water providing a generally consistence temperature at the outlet point 104.

Figure 2:
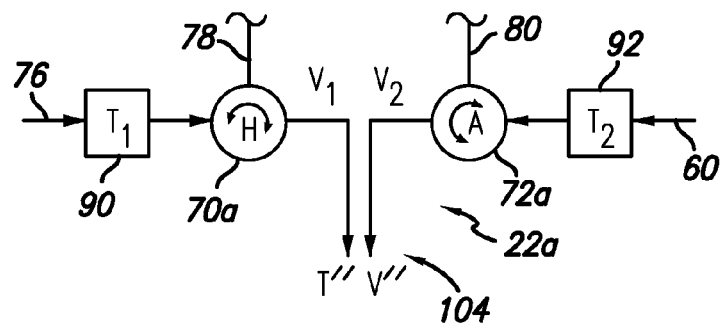
FIG. 2 is a first embodiment of a controlled portion of the system.

In FIG. 2, an alternate embodiment is used in which proportional valves such as spool valves 70a, 72a are used. These controllable vales are coupled over the corresponding lines 78, 80 to the controller 26.

Figure 3:
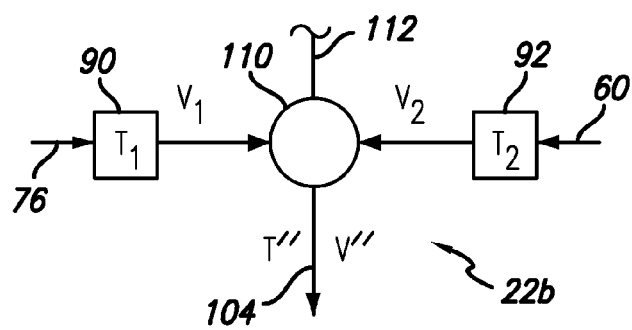
FIG. 3 is a second embodiment of a controlled portion of this system.

In FIG. 3, an additional alternate embodiment is disclosed in which the two valves in the prior embodiments are combined into a single proportional control valve 110. The control valve 110 is coupled to the controller 26 over control line 112. The proportional control valve 110 includes mechanisms which can be controlled in a single valve component to proportionally allow flow from the corresponding water line 76, 60 resulting in a desired volume of water at a desired temperature at the dispensing point 104.

Figure 4:
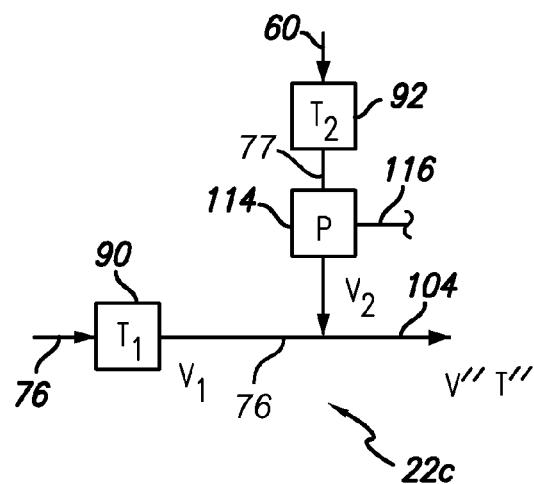
FIG. 4 is a third embodiment of a controlled portion of this system.

In an additional embodiment in FIG. 4, the temperature dispensed at the dispensing point 104 is controlled by adding a volume of ambient water $v_2$ to a generally consistent stream of heated water $v_1$. In other words the flow of heated water $v_1$ is generally consistent. By operating a proportional control valve 114 coupled to the controller 26 by control line 116 the volume of flow $v_1$ is diluted by volume of flow $v_2$ to provide a selected resultant volume at a selected temperature. In other words, the components as shown in FIG. 4 replace the heated water valve 70 and ambient water valve 72 as well as the output temperature sensor 100. As such, water 77 is permitted to flow or not flow in response to the operation of the proportional control valve 114. When the system is operated to dispense water, the control valve 64 is operated to allow water to flow into the reservoir 32 displacing water 34 in the reservoir which is then dispensed through line 76.

An additional component of this system involves a user interface 119. The user interface 119 may be a combination of elements such as represented by the temperature control 120 and the volume 122 coupled to the controller 26 by lines 124, 126, respectively. For example, the user can use a dial, touch screen, numeric key pad or other input device to select a temperature at which the water should be dispensed. Similarly, such devices can be used to set a desired volume. The controller 26 uses the inputs from these two devices 120, 122 to program the operation of the system 20 for the selected dispensing cycle. Alternatively, a separate user interface 140 is coupled to the controller over line 142 to provide consolidated control. Such a user interface could provide any number of user selected input signals, recipes, or other commands to the controller 26.

The user interface 140 may be in the form a recipe selection device in which a user selects a desired recipe from a menu of recipes on a display screen, it may also be a media reading device such as a barcode scanner, RFID reader or other interactive media reading device which can read information from media or a technology device which might be contained or carried on a product package. For example, the product packaging for mashed potatoes may include an imbedded RFID, barcode, magnetic strip or other device. This information can be read by the user interface 140 to provide information on controlling the system to the controller 26. The user interface in this embodiment may also provide a start or go button which allows the user to enter the information, receive confirmation from the controller 26 that the information has been received and then select go or start to start the process of dispensing heated water at the selected volume and selected temperature.

The user interface 140 may also provide an embodiment in which pre-selected pictures of the food, beverages, or the products to be produced are displayed. For example, if a restaurant franchise includes only one volume of mashed potatoes to be produced for a selected recipe a picture of mashed potatoes can be displayed on the user interface. This allows the user to simply push the button identified as mashed potatoes to operate the machine to dispense the selected volume of water at the selected temperature for the mashed potato recipe. It should be noted that the reference to the term "selected" may involve actual selection by the user or may involve selection of some other component by the user which is related to a predetermine recipe includes measurable volumes and temperatures. In other words, the user may not intentionally select the temperature in volume, but may make a recipe or other selection, such a visual representation of mash potatoes, which results in the equipment employing a selected volume of water and a selected temperature. As such, these are made directly controlled by entering specific numerical values or indirectly controlled by selecting icons or other information associated with the recipe or numerical values to control the volume and temperature.

Similarly, an icon or picture representation associated with dough such as bread or pizza crust can be displayed on user interface 140 allowing the user to make that selection and produce the volume and temperature of water to use in mixing dough.

As an additional consideration, the information inputted into the user interface 140 or even using the temperature and volume controls 120, 122, can also be interpreted by the controller 26 to provide specific dispensing operations or controls. In this regard, volume, temperature, pulse routines, and selective dispensing of either heated or ambient water can be controlled by the controller 26. A selected recipe may allow for producing a volume of one temperature of water to produce mixing and a subsequent temperature of water for use in continued mixing. The controller 26 could use a recipe with these different volumes and temperatures to dispense into a single container 200.

The container can be placed on a dispensing station 202 proximate to dispensing point 104 to receive water dispensed from the system 20. The station 202 is coupled via control line 204 to the controller 26 to provide a lock out signal if the container 200 is not present. The lock out will prevent accidental dispensing of water when the container is not present. The station 202 may be a sensor device which can detect the presence, absence, or both presence and absence of the container 200. By way of illustration and not limitation, the station 202 may be divided into the form of a weight sensor. The weight sensor can detect the presence or absence of weight and provide a signal over line 204 to the controller 26. If a predetermine weight for a container of a standard size is detected than the system may be operated on the assumption that the weight detected is the container. Alternatively, the station 202 may be equipped with a media reader such that a piece of media can be attached to the container 200. The presence or absence of the media on the station 202 can be detected by the station 202 thereby providing a signal to the controller 26. If the signal indicates the presence of media associated with a container, then the system can be operated. If the media is not detected, the system can be locked out from dispensing. As might be expected, this can prevent the unintentional dispensing of water when a container is not present at the station 202.

As such, the mashed potato recipe entered either through any of the user interfaces 140, 120, 122 can result in dispensing an initial volume of water at an initial temperature to help dissolve the potatoes. Continued dispensing through pulse routines or other dispensing volumes can be used to controllably mix the potatoes. The resultant end product of potatoes will ultimately include the desired volume of water at the desired temperature even if the temperature and volume are controllably altered during the dispensing cycle.

It should be appreciated based on the teachings of the present disclosure that the system as described herein can also be used in combination with a beverage making or brewing system. In this regard, it may be desirable to produce beverages using different temperatures of water and different pulse routines.

For example, it may be desirable to brew coffee at a temperature of about 200° F.-205° F. It may also be desirable to produce teas at different ranges of temperature. For example, the following teas may have brewing temperatures that provide preferred extraction: green tea 175° F., white tea 180° F., Oolong Tea 190° F., and black tea as well as herbal/tisanes teas at 212° F. The present system as disclosed herein can accommodate these different beverage brewing temperatures in back-to-back dispensing sequences. In other words, due to the ability to control the volumes and temperatures of the water dispensed the brewing system can brew coffee and brew green tea in series. In other words, a gallon of coffee can be dispensed using water at a temperature of 195° F. and when this brewing cycle is complete a batch of green tea can be brewed at a temperature of 160° F. This back-to-back brewing using volumes and temperatures that are relatively precisely controlled provides advantages over the prior art. While in some situations the prior art system may be useful, in other situations it may be desirable to have the increased precision as disclosed herein.

The invention claimed is:

1. A system for controllably dispensing heated water comprising:
   a controller;
   a heated water reservoir;
   an ambient water source;
   a first valve coupled to the controller and communicating with the ambient water source and the heated water reservoir for controllably dispensing ambient water to the heated water reservoir;
   a second valve coupled to the controller and communicating with the ambient water source and an ambient water line for controllably dispensing ambient water to the system;
   a heated water control valve coupled to the controller and communicating with the heated water reservoir for controllably dispensing heated water from the heated water reservoir;
   an ambient control valve coupled to the controller and communicating with the ambient water line for controllably dispensing ambient water from the ambient water line;
   a heated water line dispensing water from the heated water reservoir;
   a heated water temperature sensor coupled to the heated water line and to the controller for providing temperature information to the controller;
   an ambient water temperature sensor coupled to the ambient water line and to the controller for providing temperature information to the controller;
   an output temperature sensor coupled to the outputs from the heated water line and the ambient water line and communicating with the controller; and
   a user interface coupled to the controller for selecting a volume and temperature of water to be dispensed.

2. The system of claim 1, further comprising a media reader coupled to the controller for providing an input to the controller for indirectly selecting a volume of water and a temperature of water of the volume of water to be dispensed from the system.

3. The system of claim 2, a media device associated with an item to be used with the system, the media device being compatible with the media reader.

4. The system of claim 2, wherein the user interface includes a display for displaying images of the item to be made using a volume and temperature of water to be dispensed from the system, the user interface including selectors for selecting an image from one of the images displayed.

5. The system of claim 1, at least one of the heated water control valve and the ambient water control valve being controllable for intermittently dispensing water over a dispense cycle.

6. The system of claim 1, further comprising a container station coupled to the controller for detecting at least one of the presence and absence of a container at the station.

7. A system for controllably dispensing heated water comprising:
a controller;
a heated water reservoir;
an ambient water source;
a first valve coupled to the controller and communicating with the ambient water source and the heated water reservoir for controllably dispensing ambient water to the heated water reservoir;
a heated water dispensing line communicating with the heated water reservoir;
a second valve coupled to the controller and communicating with the ambient water source and an ambient water line for controllably dispensing ambient water to the system;
a proportional control valve coupled to the controller and communicating upstream with the ambient water line and communicating downstream with the heated water dispensing line;
a heated water line dispensing water from the heated water reservoir;
a heated water temperature sensor coupled to the heated water line and to the controller for providing temperature information to the controller;
an ambient water temperature sensor coupled to the ambient water line and to the controller for providing temperature information to the controller;
an output temperature sensor coupled to the outputs from the heated water line and the ambient water line and communicating with the controller; and
a user interface coupled to the controller for selecting a volume and temperature of water to be dispensed.

8. The system of claim 7, further comprising a media reader coupled to the controller for providing an input to the controller for indirectly selecting a volume of water and a temperature of water of the volume of water to be dispensed from the system.

9. The system of claim 8, further comprising a media device associated with an item to be used with the system, the media device being compatible with the media reader.

10. The system of claim 8, wherein the user interface includes a display for displaying images of the item to be made using a volume and temperature of water to be dispensed from the system, the user interface including selectors for selecting an image from one of the images displayed.

11. The system of claim 7, at least one of the first valve, second valve, and the ambient water control valve being controllable for intermittently dispensing water over a dispense cycle.

12. The system of claim 7, further comprising a container station coupled to the controller for detecting at least one of the presence and absence of a container at the station.

13. A method for controllably dispensing heated water comprising:
providing a controller;
providing a heated water reservoir;
providing an ambient water source;
providing a first valve coupled to the controller and communicating with the ambient water source and the heated water reservoir;
controllably operating the first valve for dispensing ambient water to the heated water reservoir;
providing a second valve coupled to the controller and communicating with the ambient water source and an ambient water line;
controllably operating the second valve for dispensing ambient water to the system;
providing a heated water control valve coupled to the controller and communicating with the heated water reservoir;
controllably operating the heated water control valve for dispensing heated water from the heated water reservoir to a heated water line;
providing an ambient control valve coupled to the controller and communicating with the ambient water line;
controllably operating the ambient control valve for dispensing ambient water from the ambient water line;
providing a heated water temperature sensor coupled to the heated water line and to the controller;
providing temperature information from the heated water temperature sensor to the controller;
an ambient water temperature sensor coupled to the ambient water line and to the controller for providing temperature information to the controller;
providing an output temperature sensor coupled to the outputs from the heated water line and the ambient water line and communicating with the controller
providing temperature information from the output temperature sensor to the controller; and
a user interface coupled to the controller for selecting a volume and temperature of water to be dispensed.

14. A method for controllably dispensing heated water comprising:
providing a controller;
providing a heated water reservoir;
providing an ambient water source;
providing a first valve coupled to the controller and communicating with the ambient water source and the heated water reservoir;
controllably operating the first valve for dispensing ambient water to the heated water reservoir;
a heated water dispensing line communicating with the heated water reservoir; providing a second valve coupled to the controller and communicating with the ambient water source and an ambient water line;
controllably operating the second valve for dispensing ambient water to the system; providing a proportional control valve coupled to the controller and communicating upstream with the ambient water line and communicating downstream with the heated water dispensing line;
providing a heated water temperature sensor coupled to the heated water dispensing line and to the controller;
providing temperature information from the heated water temperature sensor to the controller;
providing an ambient water temperature sensor coupled to the ambient water line and to the controller;
providing temperature information from the ambient water temperature sensor to the controller;
providing an output temperature sensor coupled to the outputs from the heated water line and the ambient water line and communicating with the controller
providing temperature information from the output temperature sensor to the controller;
a user interface coupled to the controller; and
using the controller to select a volume and temperature of water to be dispensed.

15. The system of claim 1, wherein at least one of the second valve and the heated water control valve are operable to dispense pulses of water.

\* \* \* \* \*